United States Patent
Li et al.

(10) Patent No.: US 9,652,068 B2
(45) Date of Patent: May 16, 2017

(54) ELECTRONIC DEVICE AND INFORMATION PROCESSING METHOD

(71) Applicant: LENOVO (BEIJING) LIMITED, Beijing (CN)

(72) Inventors: Fanzhi Li, Beijing (CN); Jianjun Pang, Beijing (CN)

(73) Assignee: LENOVO (BEIJING) LIMITED, Beijing (CN)

( * ) Notice: Subject to any disclaimer, the term of this patent is extended or adjusted under 35 U.S.C. 154(b) by 0 days.

(21) Appl. No.: 14/497,433

(22) Filed: Sep. 26, 2014

(65) Prior Publication Data

US 2015/0277645 A1    Oct. 1, 2015

(30) Foreign Application Priority Data

Mar. 28, 2014  (CN) .......................... 2014 1 0123066

(51) Int. Cl.
*G06F 3/041*   (2006.01)

(52) U.S. Cl.
CPC .. *G06F 3/0414* (2013.01); *G06F 2203/04102* (2013.01); *G06F 2203/04105* (2013.01)

(58) Field of Classification Search
CPC ................... G06F 3/0414; G06F 2203/04105
USPC .................... 178/18.01–19.07; 345/173–178
See application file for complete search history.

(56) References Cited

U.S. PATENT DOCUMENTS

| | | | |
|---|---|---|---|
| 6,243,074 B1 * | 6/2001 | Fishkin | G06F 1/16 345/156 |
| 2013/0009882 A1 * | 1/2013 | Salmela | G06F 3/016 345/173 |
| 2014/0101560 A1 * | 4/2014 | Kwak | G06F 1/1652 715/738 |
| 2014/0267039 A1 * | 9/2014 | Curtis | G06F 3/0338 345/161 |

* cited by examiner

*Primary Examiner* — Michael Pervan

(57) ABSTRACT

The present disclosure discloses an electronic device and an information processing method, which can solve the technical problem that the conventional electronic device's surface panel is easily damaged under an external force. The electronic device comprises: a panel located on a first surface of the electronic device, a force-bearing surface of the panel being a deformable surface; a first sensor corresponding to the panel and configured to detect a deformation quantity of the force-bearing surface; and a processor connected to the first sensor and configured to determine a first parameter of an applied force applied on the force-bearing surface based on the deformation quantity and to determine a corresponding execution instruction based on the first parameter.

11 Claims, 4 Drawing Sheets

ELECTRONIC DEVICE AND INFORMATION PROCESSING METHOD

CROSS REFERENCE TO RELATED APPLICATIONS

This application claims priority from Chinese National Application No. 201410123066.X filed on Mar. 28, 2014, the contents of which are incorporated herein by reference.

BACKGROUND OF THE INVENTION

Field of the Invention

The present disclosure relates to the field of electronic technology, and more particularly, to an electronic device and an information processing method.

Description of the Related Art

With the development of electronic technology, there are more and more kinds of electronic devices with increasingly powerful functions, thereby bringing great convenience to people's daily works and lives.

However there is a problem that a surface panel of the electronic device is of excessive rigidity, which results in that the surface panel is easily damaged under an external force.

SUMMARY

The present disclosure provides an electronic device and an information processing method, which can solve the technical problem that the conventional electronic device's surface panel is easily damaged under an external force. With a deformable surface panel the anti-pressure capability of the surface panel is improved.

According to a first aspect of embodiments of the present disclosure, an electronic device is provided. The electronic device comprises: a panel arranged on a first surface of the electronic device, a force-bearing surface of the panel being a deformable surface; a first sensor corresponding to the panel and configured to detect a deformation quantity of the force-bearing surface; and a processor connected to the first sensor and configured to determine a first parameter of an applied force applied on the force-bearing surface based on the deformation quantity and to determine a corresponding execution instruction based on the first parameter.

Preferably, the first sensor comprises a resistance strain gauge attached to the force-bearing surface and capable of completely covering the force-bearing surface. The resistance strain gauge deforms in the same magnitude with the deformation of the force-bearing surface, during which a resistance of the resistance strain gauge changes, thereby allowing the deformation quantity of the force-bearing surface to be determined based on electrical parameter values detected by the first sensor.

Preferably, the first parameter comprises a direction parameter of the applied force. The processor determining the first parameter of the applied force applied on the force-bearing surface based on the deformation quantity comprises the processor determining the direction parameter based on the deformation quantity of the force-bearing surface when a force-apply body applying the applied force stays in a relatively fixed position with respect to the force-bearing surface.

Preferably, the electronic device further comprises a second sensor connected to the processor and configured to detect a second parameter of the applied force. Said determining the corresponding execution instruction based on the first parameter comprises the processor determining the execution instruction based on the first parameter and the second parameter.

Preferably, the electronic device is capable of responding to the applied force in at least two response modes. The processor determining the execution instruction comprises: determining that the electronic device is in a first response mode of the at least two response modes based on the second parameter; and generating the execution instruction for causing the electronic device to respond to the applied force in the first response mode.

Preferably, the panel is a display panel, and the execution instruction determined by the processor based on the first parameter comprises causing the display panel to display first information related to the execution instruction.

Preferably, a surface of the panel opposite to the force-bearing surface deforms with the deformation of the force-bearing surface.

Preferably, the electronic device further comprises: a housing arranged on a surface of the electronic device other than the first surface and configured to fix the panel. The housing deforms with bending of the panel.

According to a second aspect of embodiments of the present disclosure, an information processing method is provided for use in an electronic device comprising a panel having a deformable force-bearing surface. The method comprises: detecting, by a first sensor, a deformation quantity of the force-bearing surface; determining a first parameter of an applied force applied on the force-bearing surface based on the deformation quantity; and determining an execution instruction for causing the electronic device to respond to the applied force based on the first parameter.

Preferably the first sensor comprises a resistance strain gauge attached to the force-bearing surface and capable of completely covering the force-bearing surface. The resistance strain gauge deforms in the same magnitude with the deformation of the force-bearing surface, during which a resistance of the resistance strain gauge changes. Said detecting, by the first sensor, the deformation quantity of the force-bearing surface comprises.

Preferably, the first parameter comprises a direction parameter of the applied force. Said determining the first parameter of the applied force applied on the force-bearing surface based on the deformation quantity comprises: determining the direction parameter based on the deformation quantity of the force-bearing surface when a force-apply body applying the applied force stays in a relatively fixed position with respect to the force-bearing surface.

Preferably, the electronic device further comprises a second sensor configured to detect a second parameter of the applied force. Said determining the execution instruction for causing the electronic device to respond to the applied force based on the first parameter comprises: determining the execution instruction based on the first parameter and the second parameter.

Preferably, the electronic device is capable of responding to the applied force in at least two response modes. Said determining the execution instruction based on the first parameter and the second parameter comprises: determining that the electronic device is in a first response mode of the at least two response modes based on the second parameter; and generating the execution instruction for causing the electronic device to respond to the applied force in the first response mode.

According to a third aspect of embodiments of the present disclosure, an electronic device is provided. The electronic device comprises: a panel arranged on a first surface of the electronic device. A force-bearing surface of the panel is capable of inwardly deforming along a direction of an external force applied thereon.

Preferably the electronic device further comprises: a housing arranged on a surface of the electronic device other than the first surface and configured to fix the panel. The housing maintains a stable form when the panel deforms, or the housing deforms with bending of the panel.

One or more technical solutions according to embodiments of the present disclosure have at least technical effects or advantages as follows.

In the embodiments of the present disclosure, a panel 10 of an electronic device has its force-bearing surface 101 set as a deformable surface. In this case, when an external force is applied on the panel 10, it can relieve stresses through deformation of the force-bearing surface. This can reduce the probability that the whole panel is damaged, and solve the technical problem that the conventional electronic device's surface panel is easily damaged under an external force. Therefore, the surface panel's capability of avoiding damage caused by an external force is improved by using the deformable surface panel.

In the embodiments of the present disclosure, the electronic device can detect a deformation quantity of the force-bearing surface 101 and determine a corresponding execution instruction based on the deformation quantity. In this manner a user can apply, on the panel 10, an applied force which deforms the force-bearing surface 101, as an input operation, and the electronic device performs a corresponding operation in response to the applied force. Thereby, an interaction with the electronic device can be achieved by deforming the force-bearing surface, which enriches interaction ways of the electronic device and improves user experience.

DETAILED DESCRIPTION OF THE EMBODIMENTS

The present disclosure provides an electronic device and an information processing method, which can solve the technical problem that the conventional electronic device's surface panel is easily damaged under an external force. With a deformable surface panel, the anti-pressure capability of the surface panel is improved.

The technical solutions of the present disclosure will be described in detail below in conjunction with accompanying drawings and specific embodiments. It should be understood that the embodiments of the present disclosure and specific features therein are indented to specifically describe the technical solutions of the present disclosure, instead of limiting the technical solutions of the present disclosure. The embodiments of the present disclosure and technical features therein can be combined with each other without conflict.

First Embodiment

The first embodiment of the present disclosure provides an electronic device, which may be a tablet computer, a smart phone, a notebook computer, a smart watch and the like.

Figure 1:
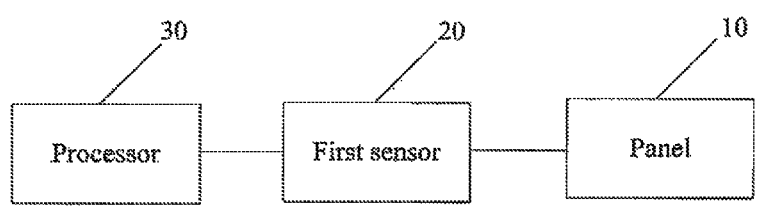
FIG. 1 is a schematic block diagram of an electronic device according to a first embodiment of the present disclosure.
Figure 2:
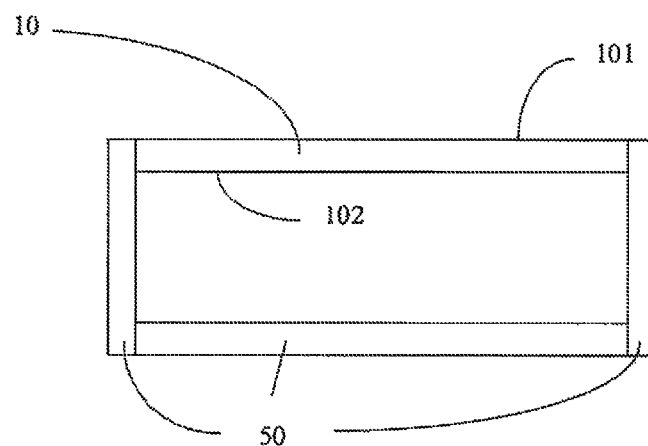
FIG. 2 is a side view of the electronic device according to the first embodiment of the present disclosure.

With reference to FIGS. 1 and 2, the electronic device comprises a panel 10, a first sensor 20, and a processor 30.

The panel 10 is arranged on a first surface of the electronic device. A force-bearing surface 101 of the panel 10 is a deformable surface. Specifically, the first surface may be a front surface of the electronic device, and the panel 10 may be either a display panel with a display function or a panel without a display function.

The force-bearing surface 101 may be deformable in at least two manners as follows. In a first manner, the panel 10 is made of a deformable material. In a second manner, an accommodation space is formed in the panel 10 and is filled with fluid medium such as liquid, gas, etc., and the force-bearing surface 101 is made of a deformable material. The force-bearing surface 101 deforms when an external force is applied thereon, thereby moving the fluid medium filled within the panel.

The first sensor 20 is connected to both the panel 10 and the processor 30 and is configured to detect a deformation quantity of the force-bearing surface 101. The processor 30 may determine a first parameter of an applied force applied on the force-bearing surface 101 based on the deformation quantity detected by the first sensor 20. The first parameter may include parameters such as a magnitude of the applied force, a direction of the applied force, or a position in which the applied force is applied, or any combination thereof. Then, the electronic device may determine, based on the first parameter, a corresponding execution instruction, in response to which the electronic device performs a corresponding operation.

Having the force-bearing surface 101 of the panel set as a deformable surface, when an external force is applied on the panel 10 of the electronic device according to the embodiment of the present disclosure, the panel 10 can relieve stresses through the deformation of the force-bearing surface. This can reduce the probability that the whole panel is damaged, and solve the technical problem the conventional electronic device's surface panel is easily damaged under an external force. Therefore, the surface panel's capability of avoiding damage caused by an external force is improved by using the deformable surface panel.

Moreover, in the above technical solution according to the embodiment of the present disclosure, the electronic device can detect a deformation quantity of the force-bearing surface 101 and determine a corresponding execution instruction based on the deformation quantity. In this manner, a user can apply, on the panel 10, an applied force which deforms the force-bearing surface 101, as an input operation, and the electronic device performs a corresponding operation in response to the applied force. Thereby, an interaction with the electronic device can be achieved by deforming the force-bearing surface, which enriches interaction ways of the electronic device and improves user experience.

Further, in the embodiment of the present disclosure, the first sensor 20 may detect the deformation quantity of the force-bearing surface 101 in various manners, three of which will be described by way of example. Of course, the present disclosure is not limited to the following three manners.

In a first manner, the first sensor is a strain resistance sensor having an elastic element. The elastic element may be a resistance strain gauge 201. The resistance strain gauge 201 is attached to the force-bearing surface 101 and capable of completely covering the force-bearing surface 101. The resistance strain gauge 201 deforms in the same magnitude with the deformation of the force-bearing surface 101. During the deformation of the force-bearing surface 101, a resistance of the resistance strain gauge 201 changes, thereby allowing the deformation quantity of the force-bearing surface to be determined based on electrical parameter values defected by the first sensor.

Figure 3A:
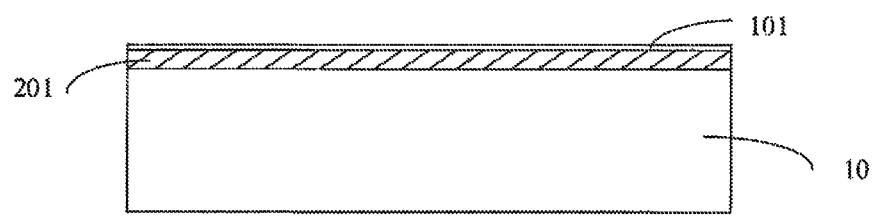
FIGS. 3*a*-3*c* are side views of a force-bearing surface and a resistance strain gauge according to the first embodiment of the present disclosure.
Figure 3B:
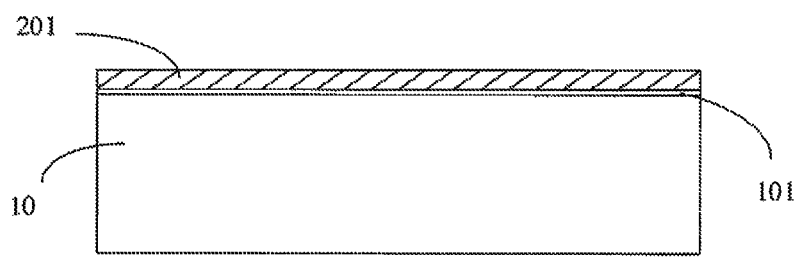
Figure 3C:
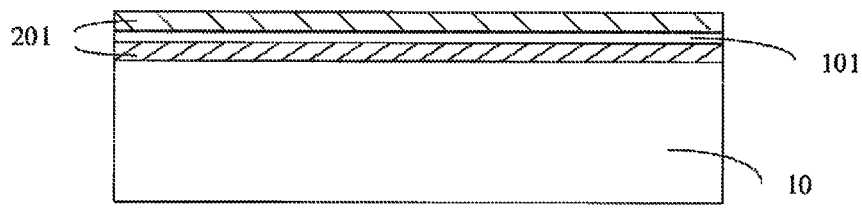

Specifically, the resistance strain gauge 201 may be either a continuous sheet structure covering the force-bearing surface 101, or an array comprised of a number of closely arranged resistance strain gauges. With reference to FIG. 3a, when the panel 10 is a display panel, in order to ensure a display effect of the panel 10, the resistance strain gauge 201 may be provided inside the force-bearing surface 101, i.e., the resistance strain gauge 201 is embedded into the panel 10. With reference to FIG. 3b, when the panel 10 is not a display panel, the resistance strain gauge 201 may be provided outside the force-bearing surface 101. Preferably, with reference to FIG. 3c, the resistance strain gauge 201 may be provided both outside and inside the force-bearing surface 101. Due to a higher sensitivity of the first sensor 20 having a two-layer (inner layer and cuter layer) resistance strain gauge, the deformation quantity of the force-bearing surface 101 determined based thereon is more accurate.

In addition, the resistance strain gauge 201 may be made of either a metal conductor or a semiconductor material. If the resistance strain gauge 201 is made of a metal conductor when the metal conductor deforms mechanically under an external force, a resistance thereof changes with the mechanical deformation, and thereby electrical parameter values detected by a circuit part of the first sensor 20 will change. If the resistance strain gauge 201 is made of a semiconductor material, when the semiconductor material is subjected to an external force, a resistivity thereof will change, and thereby electrical parameter values defected by the circuit part of the first sensor 20 will change.

In the above two cases, as the defected electrical parameter values change with the deformation quantity of the force-bearing surface 101, the deformation quantity of the force-bearing surface 101 may be determined based on the electrical parameter values detected by the first sensor by employing a specific mathematical model.

In a second manner, the first sensor 20 is a surface acoustic wave sensor. The surface acoustic wave sensor uses a piezoelectric substrate (such as a quartz substrate) as a pressure vibration membrane, which deforms in the same magnitude with the deformation of the force-bearing surface 101. Due to a change in a distribution of stresses/strains, the deformed piezoelectric substrate leads to a change in a propagation speed of a surface acoustic wave thereon. In an oscillator mode with a surface acoustic wave device as a feedback element, an output frequency signal thereof and the applied force are in an excellent linear relationship. On basis of this, the magnitude of the applied force and the deformation quantity of the force-bearing surface 101 are detected.

In a third manner, when the panel 10 is a structure having an accommodation space filled with fluid medium, the first sensor 20 comprises two opposite pole plates. A lower pole plate is arranged on a bottom surface 102 of the panel opposite to the force-bearing surface, and an upper pole plate is attached beneath the force-bearing surface 101, in such a manner that the accommodation space and the fluid medium therein are placed between the two pole plates, thereby forming a capacitor. The upper pole plate is made of a deformable material, and can deform in the same magnitude with the deformation of the force-bearing surface 101. After the upper pole plate deforms, the fluid medium between the two pole plates is extruded to move. A spatial distribution of the moved fluid medium will change, and thereby an electric field generated by the capacitor will change. After detecting field intensities at spatial acquisition positions, a detection apparatus in the first sensor may simulate the spatial distribution of the fluid medium based on a mathematical model, thereby determining the deformation quantity of the force-bearing surface 101.

Further, in determining the first parameter of the applied force based on the deformation quantity and determining the corresponding execution instruction based on the first parameter, the processor 30 may generate different execution instructions for different first parameters.

When the first parameter includes a magnitude of the applied force, the processor 30 may determine the magnitude of the applied force based on the deformation quantify of the force-bearing surface 101 and deformation parameters (such as an elasticity modulus, a Poisson's ratio etc.) of the force-bearing surface 101 and a strain structure (such as the resistance strain gauge 201) of the first sensor 20. The processor 30 may determine different execution instructions based on applied forces with different magnitudes.

In an example, an execution instruction generated by the processor 30 may be used to adjust a volume or brightness of the electronic device. A value of the adjusted volume or brightness corresponds to a magnitude of the applied force. When the applied force is large, the brightness or volume is correspondingly adjusted to a large value. When the applied force is small, the brightness or volume is correspondingly adjusted to a small value.

In another example, an execution instruction generated by the processor 30 may be used to cause the electronic device to output a magnitude of the applied force through an output apparatus such as a display device or a voice device, etc., or to output a value of mass corresponding to the magnitude of the applied force through the output apparatus in such a manner that a user acquires the magnitude of the force applied on the force-bearing surface 101 or mass of an object placed on the force-bearing surface 101.

In yet another example, the processor may determine a pressure-sensitive level corresponding to the magnitude of the applied force based on the first parameter, and generate an execution instruction for causing the electronic device to respond to the applied force in a response mode corresponding to the pressure-sensitive level. The corresponding response mode may vary for different pressure-sensitive levels. For example, when the magnitude of the applied force is small and the pressure-sensitive level is low, the corresponding response mode is to adjust the volume or brightness of the electronic device, and when the pressure-sensitive level is higher than a set threshold, the corresponding response mode is to invoke a predetermined application such as a camera or music player, etc.

Further, the first parameter may include a direction parameter of the applied force, which may be determined by the electronic device in various manners. Although three manners will be described by way of example, the present disclosure is not limited thereto.

In a first manner, when a force-apply body applying an applied force stays in a relatively fixed position with respect to the force-bearing surface 101, the processor 30 determines the direction parameter based on the deformation quantity of the force-bearing surface 101.

Specifically, when a force-apply body (such as a finger of a user) applies an applied force on the force-bearing surface 101 and stays in a relatively fixed position relationship with respect to the force-bearing surface 101 (the deformation quantity of the force-bearing surface 101 is also fixed at this time), the processor 30 determines a direction of the applied force based on a component of the deformation quantity in the spatial direction.

Figure 4:
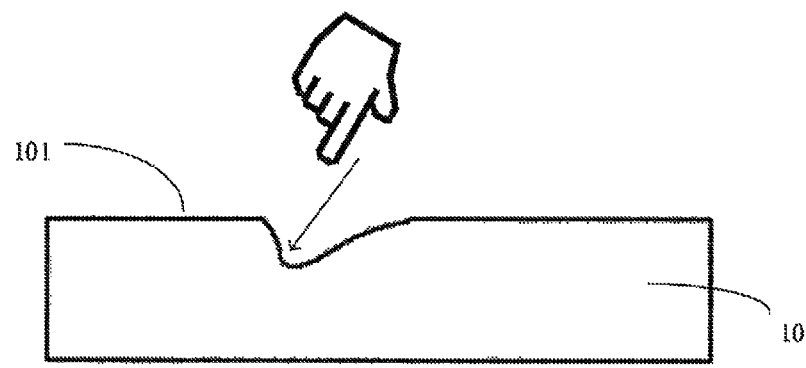
FIG. 4 is a schematic diagram of deformation of the force-bearing surface under an external force according to the first embodiment of the present disclosure.

For example, when a component of the deformation quantity in parallel to the force-bearing surface is centrosymmetric, the direction of the applied force may be determined to be perpendicular to the force-bearing surface 101. In another example, with reference to FIG. 4, when a deformation depth is larger on the left side of a deformation area of the force-bearing surface, it may be determined that the direction of the applied force is roughly leftward. By employing a mathematical model, the direction of the applied force can be accurately determined based on a specific distribution of the deformation quantity in the deformation area.

In a second manner, when the first sensor 20 is a strain resistance sensor made of a semiconductor material, due to the anisotropy of the semiconductor material, when applied forces with different directions are applied on the semiconductor strain gauge, the semiconductor strain gauge has different electrical properties, and electrical parameters detected by the first sensor are also different. Therefore, the direction of the applied force may also be determined by analyzing the change in the electrical parameters detected by the first sensor.

In a third manner, when the force-apply body applies an applied force on the force-bearing surface 101, if a position in which the applied force is applied changes, the processor may determine the direction parameter of the applied force based on a change of the position.

Specifically the position in which the deformation occurs may be determined through a sensing array of the first sensor 20, and the direction parameter of the applied force may be determined based on a change in the position in which the deformation occurs. For example, when an initially detected deformation area is a central position of the force-bearing surface 101, and then it is detected that the deformation area moves towards the left of the force-bearing surface gradually, it may be determined that the direction of the applied force is leftward.

Further, when the first parameter includes a direction parameter of the applied force, the processor 30 generates an execution instruction for causing the electronic device to respond to the applied force in a response mode corresponding to the direction parameter of the applied force. The corresponding response mode may vary for applied forces with different direction parameters.

In an example, when it is detected that the direction of the applied force is upward, the corresponding response mode is to adjust the volume of the electronic device to a value corresponding to the magnitude of the applied force. When if is detected that the direction of the applied force is downward, the corresponding response mode is to adjust the brightness of the display unit to a value corresponding to the magnitude of the applied force.

In another example, when it is detected that the direction of the applied force is towards the lower left, a camera is opened for a user to take pictures. When it is detected that the direction of the applied force is towards the upper right, a music player is opened for the user to listen to songs.

Figure 5:
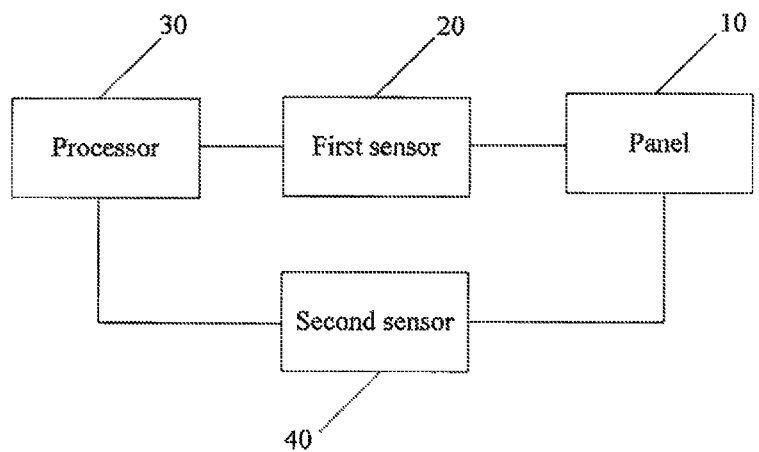
FIG. 5 is another schematic block diagram of the electronic device according to the first embodiment of the present disclosure.

In a specific implementation, in the above third manner for determining the direction parameter of the applied force, the position in which the applied force is applied may be directly detected by a sensor, and then the direction parameter of the applied force is determined based on a change in the position. The sensor for detecting the position in which the applied force is applied may be the first sensor per se (the principle of the first sensor 20 detecting the position in which force is applied lies in: detecting, by a sensing array, a position in which deformation occurs, thereby determining the in which where the applied force is applied), or a second sensor integrated with the first sensor (the first sensor and the second sensor are obtained by dividing the sensor of the electronic device in terms of functions thereof), or a second sensor separated from the first sensor. The present disclosure is not limited thereto. Further, with reference to FIG. 5, in the embodiment of the present disclosure, the electronic device may further comprise a second sensor 40 connected to the processor 30. The second sensor 40 is configured to detect a second parameter of the applied force. Said determining a corresponding execution instruction based on the first parameter comprises the processor determining the execution instruction based on the first parameter and the second parameter.

Specifically, the first sensor 20 is primarily used to detect an attribute of the applied force such as a magnitude, a direction, etc. The second sensor 40 is used to detect a position relationship parameter between the force-apply body and the force-bearing surface 101, such as an application area of the applied force, a position in which the force-apply body applies the applied force, etc. The second sensor 40 may be a sensing apparatus highly sensitive to the position relationship parameter, e.g., a capacitive sensor a pressure sensor, etc.

The second sensor 40 may accurately detect the position in which the applied force is applied in a case that the applied force is too small to deform the force-bearing surface 101, thereby determining the direction of the applied force based on the change in the position. Thereby, a user can interact with the electronic device in the following manner: a force-apply body firstly slides on the force-bearing surface in a certain direction for a distance by applying an applied force which is not sufficient to deform the force-bearing surface 101, and then applies an applied force which deforms the force-bearing surface 101; in response, the electronic device firstly determines a direction parameter of the applied force based on the detected change in the position of the applied force, then determines a corresponding response mode based on the direction parameter of the applied force, and then responds to the applied force in the corresponding response mode.

Further, the electronic device may respond to the applied force in at least two response modes. The process of the processor 30 determining an execution instruction specifically comprises: determining that the electronic device is in a first response mode of the at least two response modes based on the second parameter; and generating the execution instruction for causing the electronic device to respond to the applied force in the first response mode.

Further, when the second parameter includes a position in which the applied force is applied, the corresponding response mode may vary for applied forces at different positions. For example, when the position is located on the left side of the force-bearing surface, the corresponding response mode is to adjust the volume based on the magnitude of the applied force. When the position is located in the center of the force-bearing surface, the corresponding response mode is to display the magnitude of the applied force or a value of mass corresponding to the magnitude of the applied force. When the positron is located on the right side of the force-bearing surface 101, the corresponding response mode is to adjust a brightness of a display device based on the magnitude of the applied force.

Further, when the second parameter includes an application area of the applied force, the corresponding response mode may vary for applied forces with different application areas. For example, when the application area is larger than a certain set threshold, it corresponds to a response mode A. When the application area is smaller than or equal to the set threshold, it corresponds to a response mode B. The response mode A is to output a magnitude of the applied force or a value of mass corresponding to the magnitude of the applied force through a display unit or a voice output unit of the electronic device. The response mode B is to open a predetermined application, or to adjust a volume or brightness of the electronic device to a value corresponding to the magnitude of the applied force.

Further in the embodiment of the present disclosure, the panel 10 per se may be a display panel. A specific execution instruction determined by the processor 30 based on the first parameter comprises causing the display panel to display first information related to the execution instruction.

Specifically, when the panel 10 is a display panel, the execution instruction generated by the processor 30 may cause the display panel to display for example a magnitude of the applied force or a value of mass corresponding to the magnitude of the applied force, or to adjust the display panel to display specific information related to the first instruction, such as a display brightness adjusted based on the magnitude of the applied force, etc.

Further, a bottom surface 102 of the panel 10 opposite to the force-bearing surface 101 may deforms with the deformation of the force-bearing surface, thereby deforming the whole of the panel. This can not only allow the form of the electronic device to be more diversified and personalized, but also allow the electronic device to present a larger buffer magnitude when being subjected to an external force, thereby improving the electronic device's capability of avoiding damage caused by an external force.

Further, with reference to FIG. 2 again, the electronic device further comprises a housing 50 arranged on a surface of the electronic device other than the first surface. The panel 10 is fixed through the housing 50. The housing correspondingly deforms with bending of the panel. In this way, the electronic device can present an overall deformation characteristics. This not only improves the aesthetics of the appearance of the electronic device, but also allows the electronic device to present a larger buffer magnitude when being subjected to an external force, thereby further improving the electronic device's capability of avoiding damage caused by an external force.

Second Embodiment

The second embodiment of the present disclosure provides an information processing method corresponding to the electronic device according to the first embodiment. The method is applied in the electronic device comprising a panel 10 provided with a deformable force-bearing surface 101. Specifically, the electronic device may be a tablet computer, a smart phone, a notebook computer, a smart watch and the like.

Figure 6:
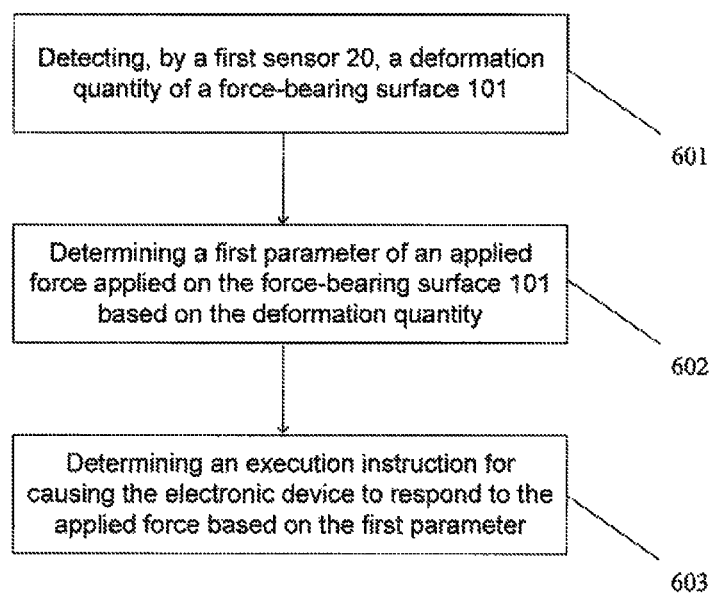
FIG. 6 is a flowchart of an information processing method according to a second embodiment of the present disclosure.

With reference to FIG. 6, the information processing method comprises:

S601: detecting, by a first sensor 20, a deformation quantity of the force-bearing surface 101;

S602: determining a first parameter of an applied force applied on the force-bearing surface 101 based on the deformation quantity; and S603: determining an execution instruction for causing the electronic device to respond to the applied force based on the first parameter.

Having the force-bearing surface 101 of the panel set as a deformable surface, when an external force is applied on the panel 10 of the electronic device according to the embodiment of the present disclosure, the panel can relieve stresses through deformation of the force-bearing surface. This can reduce the probability that the whole panel is damaged, and solve the technical problem that the conventional electronic device's surface panel is easily damaged under an external force. Therefore, the surface panel's capability of avoiding damage caused by an external force is improved by using the deformable surface panel.

Moreover, in the above technical solution according to the embodiment of the present disclosure, the electronic device can detect a deformation quantity of the force-bearing surface 101 and determine a corresponding execution instruction based on the deformation quantity. In this manner, a user can apply on the panel 10, an applied force which deforms the force-bearing surface 101, as an input operation, and the electronic device performs a corresponding operation in response to the applied force. Thereby, an interaction with the electronic device can be achieved by deforming the force-bearing surface, which enriches interaction ways of the electronic device and improves user experience.

Further, the first sensor comprises a resistance strain gauge. The resistance strain gauge is attached to the force-bearing surface and capable of completely covering the force-bearing surface. The resistance strain gauge deforms in the same magnitude with the deformation of the force-bearing surface, during which a resistance of the resistance strain gauge changes. The step 601 of detecting, by the first sensor, the deformation quantity of the force-bearing surface comprises: determining the deformation quantity of the force-bearing surface based on electrical parameter values detected by the first sensor.

Further, the first parameter includes a direction parameter of the applied force. The step 602 of determining the first parameter of the applied force applied on the force-bearing surface based on the deformation quantity comprises: determining the direction parameter based on the deformation quantity of the force-bearing surface when a force-apply body applying the applied force stays in a relatively fixed position with respect to the force-bearing surface.

Further, the electronic device further comprises a second sensor 40 configured to detect a second parameter of the applied force. The step S603 of determining the execution instruction for causing the electronic device to respond to the applied force based on the first parameter comprises: determining the execution instruction based on the first parameter and the second parameter.

Further, the electronic device is capable of responding to the applied force in at least two response modes. Said determining the execution instruction based on the first parameter and the second parameter comprises: determining that the electronic device is in a first response mode of the at least two response modes based on the second parameter; and generating the execution instruction for causing the electronic device to respond to the applied force in the first response mode.

The implementation of the electronic device in the first embodiment is also applicable to the information processing method in the second embodiment. Those skilled in the art can clearly understand the implementation of the information processing method in the second embodiment on basis of the specific description of the electronic device in the first embodiment. Therefore, the information processing method will not be described in detail here for sake of brevity.

Third Embodiment

The third embodiment of the present disclosure provides an electronic device. The electronic device may be a table computer, a smart phone, a notebook computer, a smart watch and the like. The electronic device comprises a panel arranged on a first surface of the electronic device. A force-bearing surface of the panel is capable of inwardly deforming along a direction of an external force applied thereon.

Having the force-bearing surface of the panel set as a deformable surface, when an external force is applied on the panel 10 of the electronic device according to the embodiment of the present disclosure, the panel can inwardly deform correspondingly under the applied force and relieve stresses through the deformation of the force-bearing surface. This can reduce the probability that the whole panel is damaged, and solve the technical problem that the conventional electronic device's surface panel is easily damaged under an external force. Therefore, the surface panel's capability of avoiding damage caused by an external force is improved by using the deformable surface panel.

Further, in a preferable implementation of the present embodiment, a housing of the electronic device is arranged on a surface of the electronic device other than the first surface. The panel is fixed through the housing. The housing maintains a stable form when the panel deforms, thereby enabling the whole electronic device to be able to maintain a stable form even if the force-bearing surface deforms under an external force. This enables the electronic device to operate in a good state, preventing a form change of the whole electronic device caused by an external force from influencing normal use of the electronic device.

Further, in another preferable implementation of the present embodiment, a housing of the electronic device is arranged on a surface of the electronic device other than the first surface. The panel is fixed through the housing. The housing can correspondingly deform with bending of the panel. In this way, the electronic device can present an overall deformation characteristics. This not only improves the aesthetics of the appearance of the electronic device, but also allows the electronic device to present a larger buffer magnitude when being subjected to an external force, thereby further improving the electronic device's capability of avoiding damage caused by an external force.

One or more technical solutions according to the embodiments of the present disclosure have at least technical effects or advantages as follows.

In the embodiments of the present disclosure, a panel 10 of an electronic device has its force-bearing surface 101 set as a deformable surface. In this case, when an external force is applied on the panel 10, it can relieve stresses through deformation of the force-bearing surface. This can reduce the probability that the whole panel is damaged, and solve the technical problem that the conventional electronic device's surface panel is easily damaged under an external force. Therefore, the surface panel's capability of avoiding damage caused by an external force is improved by using the deformable surface panel.

In the embodiments of the present disclosure, the electronic device can detect a deformation quantity of the force-bearing surface 101 and determine a corresponding execution instruction based on the deformation quantity. In this manner, a user can apply, on the panel 10, an applied force which deforms the force-bearing surface 101, as an input operation, and the electronic device performs a corresponding operation in response to the applied force. Thereby, an interaction with the electronic device can be achieved by deforming the force-bearing surface, which enriches interaction ways of the electronic device and improves user experience.

Those skilled in the art should appreciate that the embodiments of the present disclosure may be embodied as methods, systems, or computer program products. Therefore, forms such as hardware-only embodiments, software-only embodiments, or embodiments combining software and hardware may be used in the present disclosure. In addition, forms such as a computer program product which is implemented on one or more of computer usable storage media (comprising but not limited to a disk memory a CD-ROM, an optical memory etc.) with computer usable program codes may be used in the present disclosure.

The present disclosure is described with reference to the flowcharts and/or block diagrams of the methods, devices (systems) and computer program products according to the embodiments of the present disclosure. It should be understood that each flow and/or block in the flowcharts and/or block diagrams as well as a combination of the flows and/or blocks in the flowcharts and/or block diagrams may be implemented by computer program instructions. These computer program instructions can be provided to a processor of a general-purpose computer, a dedicated-purpose computer, an embedded processor, or other programmable data processing devices to generate a machine. Thereby the instructions executed by the processor of the computer or other programmable data processing devices generate means for implementing functions specified in one or more flows in the flowcharts and/or one or more blocks in the block diagrams.

These computer program instructions may also be stored in a computer readable memory capable of introducing a computer or other programmable data processing devices to operate in a particular mode. Thereby, the instructions stored in the computer readable memory generate an article of manufacture comprising instruction means for implementing functions specified in one or more flows in the flowcharts and/or one or more blocks in the block diagrams.

These computer program instructions may also be loaded onto a computer or other programmable data processing devices, so as to enable a series of operation steps to be performed on the computer or other programmable devices to generate a computer-implemented process. Thereby, the instructions executed on the computer or other programmable devices provide a step of implementing functions specified in one or more flows in the flowcharts and/or one or more blocks in the block diagrams.

Specifically, computer program instructions corresponding to the information processing methods according to the embodiments of the present disclosure may be stored on a storage medium such as an optical disk, a hard disk, a USB device etc., and when the computer program instructions in the storage medium corresponding to the information processing methods are read and executed by an electronic device, the following steps are comprised:

detecting, by a first sensor 20, a deformation quantity of the force-bearing surface 101;

determining a first parameter of an applied force applied on the force-bearing surface 101 based on the deformation quantity; and determining an execution instruction for causing the electronic device to respond to the applied force based on the first parameter.

Alternatively the first sensor comprises a resistance strain gauge attached to the force-bearing surface and capable of completely covering the force-bearing surface. The resistance strain gauge deforms in the same magnitude with the deformation of the force-bearing surface, during which a resistance of the resistance strain gauge changes. When computer instructions stored in a storage medium corresponding to the step of detecting the deformation quantity of the force-bearing surface are executed, the following step is specifically comprised: determining the deformation quantity of the force-bearing surface based on electrical parameter values detected by the first sensor.

Alternatively, when computer instructions stored in a storage medium corresponding to the step of determining the first parameter of the applied force applied on the force-bearing surface based on the deformation quantity are executed, the following step is specifically comprised: determining a direction parameter based on the deformation quantity of the force-bearing surface when a force-apply body applying the applied force stays in a relatively fixed position with respect to the force-bearing surface.

Alternatively, the electronic device further comprises a second sensor configured to detect a second parameter of the applied force. When computer instructions stored in a storage medium corresponding to the step of determining the execution instruction for causing the electronic device to respond to the applied force based on the first parameter are executed, the following step is specifically comprised: determining the execution instruction based on the first parameter and the second parameter.

Further, the electronic device is capable of responding to the applied force in at least two response modes. When computer instructions stored in a storage medium corresponding to the step of determining the execution instruction based on the first parameter and the second parameter are executed, the following step is specifically comprised: determining that the electronic device is in a first response mode of the at least two response modes based on the second parameter, and generating the execution instruction for causing the electronic device to respond to the applied force in the first response mode.

Although preferable embodiments of the present disclosure have been described, changes and modifications can be made to these embodiments by those skilled in the art upon learning the basic creative concepts. Therefore, the appended claims are intended to be construed as comprising the preferable embodiments and all changes and modifications that fall into the scope of the present disclosure.

Obviously, various modifications and variants can be made to the present disclosure by those skilled in the art without departing from the spirit and scope of the present disclosure. Therefore, these modifications and variants are to be encompassed by the present disclosure if they fall within the scope of the present disclosure as defined by the claims and their equivalents.

What is claimed is:

1. An electronic device, comprising:
   a panel arranged on a first surface of the electronic device, a force-bearing surface of the panel being a deformable surface;
   a first sensor corresponding to the panel and configured to detect a deformation quantity of the force-bearing surface; and
   a processor connected to the first sensor and configured to determine a first parameter of an applied force applied on the force-bearing surface based on the deformation quantity and to determine a corresponding execution instruction based on the first parameter,
   wherein the first parameter comprises a direction parameter of the applied force; and wherein the processor determining the first parameter of the applied force applied on the force-bearing surface based on the deformation quantity comprises the processor determining the direction parameter based on a component of the deformation quantity of the force-bearing surface in the spatial direction when a force-apply body applying the applied force stays in a relatively fixed position with respect to the force-bearing surface.

2. The electronic device of claim 1, wherein the first sensor comprises a resistance strain gauge attached to the force-bearing surface and capable of completely covering the force-bearing surface, and
   wherein the resistance strain gauge deforms in the same magnitude with the deformation of the force-bearing surface, during which a resistance of the resistance strain gauge changes, thereby allowing the deformation quantity of the force-bearing surface to be determined based on electrical parameter values detected by the first sensor.

3. The electronic device of claim 1, further comprising a second sensor connected to the processor and configured to detect a second parameter of the applied force,
   wherein said determining the corresponding execution instruction based on the first parameter comprises the processor determining the execution instruction based on the first parameter and the second parameter.

4. The electronic device of claim 3, wherein the electronic device is capable of responding to the applied force in at least two response modes, and wherein the processor determining the execution instruction comprises: determining that the electronic device is in a first response mode of the at least two response modes based on the second parameter; and generating the execution instruction for causing the electronic device to respond to the applied force in the first response mode.

5. The electronic device of claim 1, wherein the panel is a display panel, and the execution instruction determined by the processor based on the first parameter comprises: causing the display panel to display first information related to the execution instruction.

6. The electronic device of claim 1, wherein a surface of the panel opposite to the force-bearing surface deforms with the deformation of the force-bearing surface.

7. The electronic device of claim 1, further comprising:
   a housing arranged on a surface of the electronic device other than the first surface and configured to fix the panel,
   wherein the housing deforms with bending of the panel.

8. An information processing method applied in an electronic device comprising a panel having a deformable force-bearing surface, the method comprising:

detecting, by a first sensor, a deformation quantity of the force-bearing surface;

determining a first parameter of an applied force applied on the force-bearing surface based on the deformation quantity; and determining an execution instruction for causing the electronic device to respond to the applied force based on the first parameter, wherein the first parameter comprises a direction parameter of the applied force, and wherein said determining the first parameter of the applied force applied on the force-bearing surface based on the deformation quantity comprises:

determining the direction parameter based on a component of the deformation quantity of the force-bearing surface in the spatial direction when a force-apply body applying the applied force stays in a relatively fixed position with respect to the force-bearing surface.

9. The method of claim 8, wherein the first sensor comprises a resistance strain gauge attached to the force-bearing surface and capable of completely covering the force-bearing surface, and wherein the resistance strain gauge deforms in the same magnitude with the deformation of the force-bearing surface, during which a resistance of the resistance strain gauge changes, and wherein said detecting, by the first sensor, the deformation quantity of the force-bearing surface comprises:

determining the deformation quantity of the force-bearing surface based on electrical parameter values detected by the first sensor.

10. The method of claim 8, wherein the electronic device further comprises a second sensor configured to detect a second parameter of the applied force, and wherein said determining the execution instruction for causing the electronic device to respond to the applied force based on the first parameter comprises:

determining the execution instruction based on the first parameter and the second parameter.

11. The method of claim 10, wherein the electronic device is capable of responding to the applied force in at least two response modes, and wherein said determining the execution instruction based on the first parameter and the second parameter comprises:

determining that the electronic device is in a first response mode of the at least two response modes based on the second parameter; and generating the execution instruction for causing the electronic device to respond to the applied force in the first response mode.

* * * * *